Aug. 2, 1927.
W. H. NORDHAUS
1,637,426
MACHINE FOR COATING ELECTRIC STORAGE BATTERY PLATES
Filed Aug. 29, 1921      4 Sheets-Sheet 3
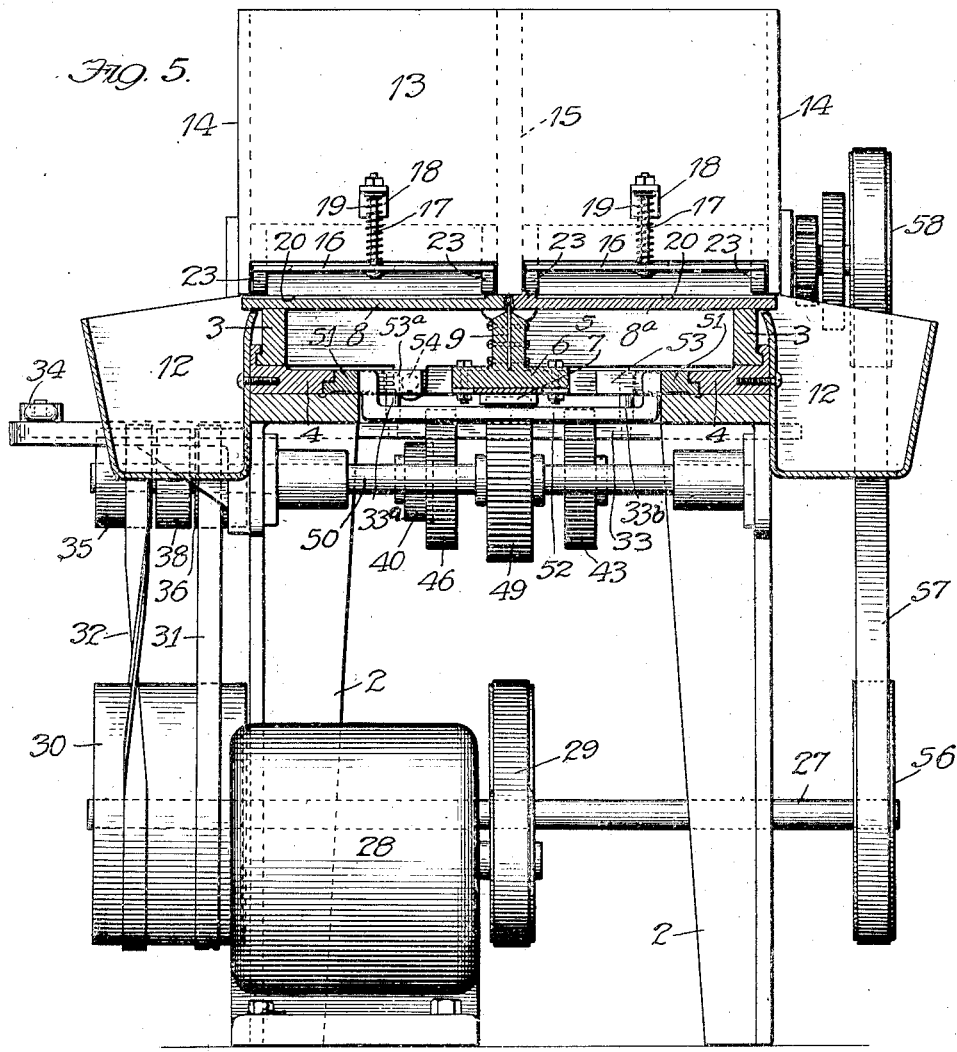
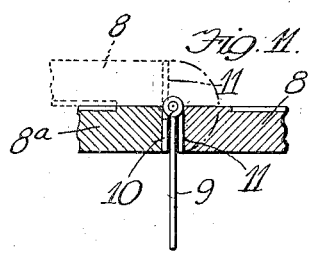
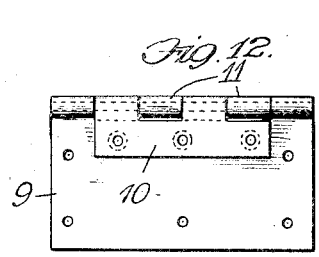
Witness
Martin H. Olsen.
Inventor
William H. Nordhaus
By Rector, Hibben, Davis & Macaulay
his Attys Aug. 2, 1927.

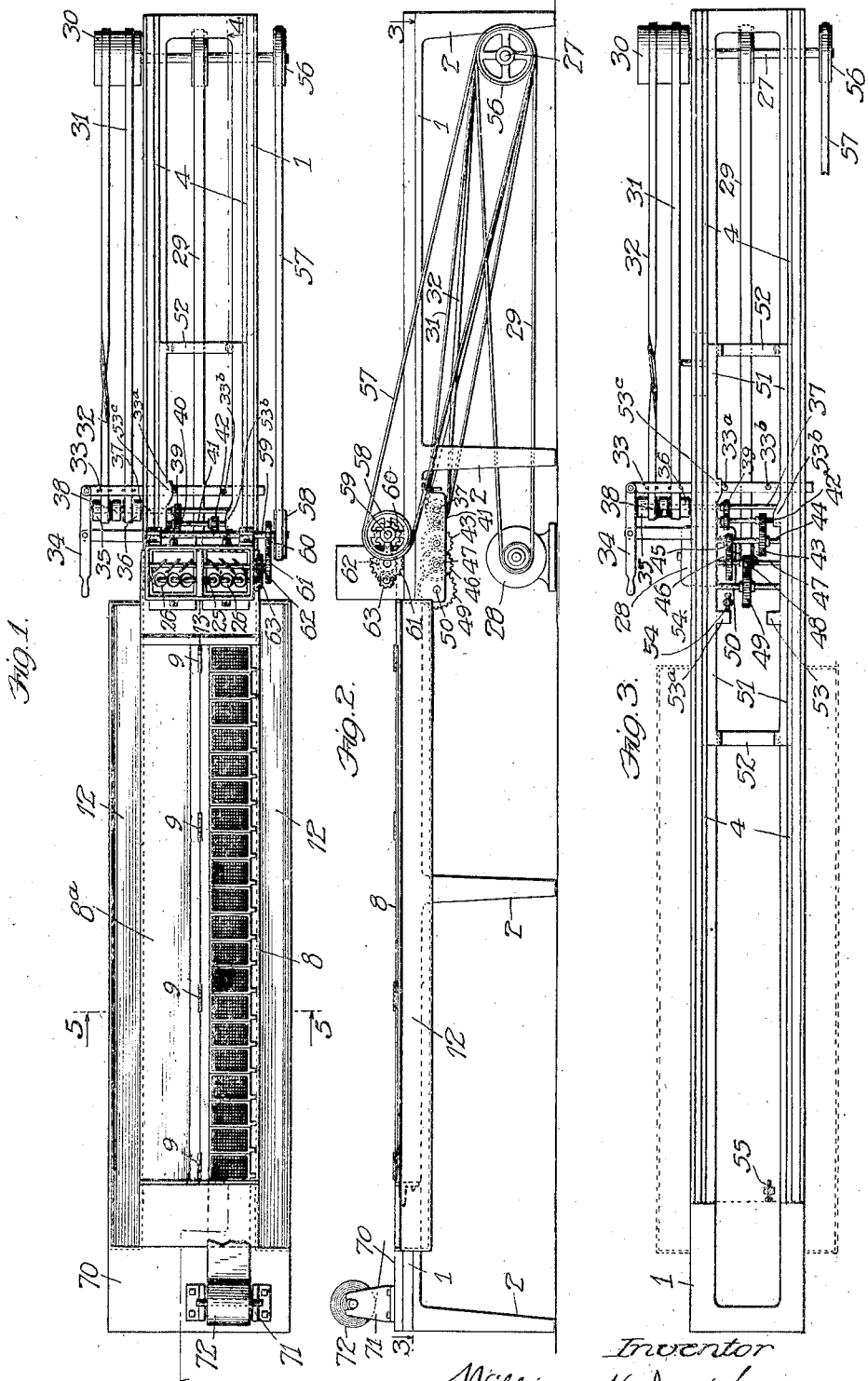

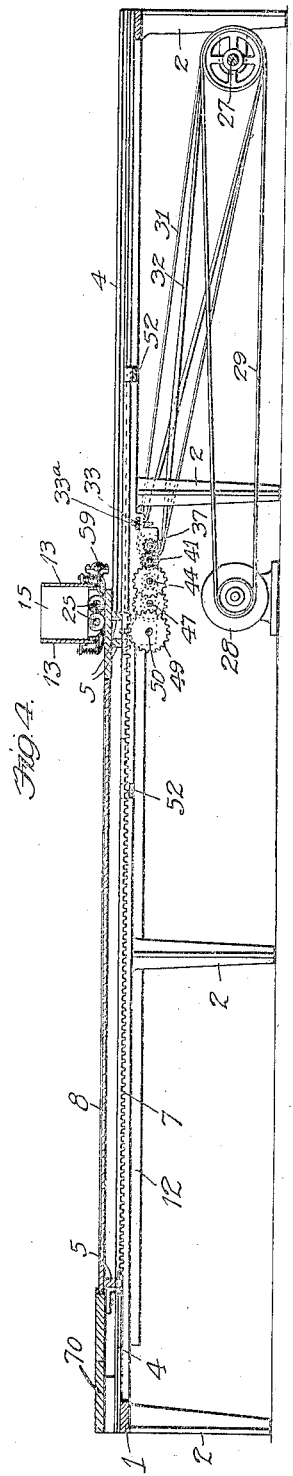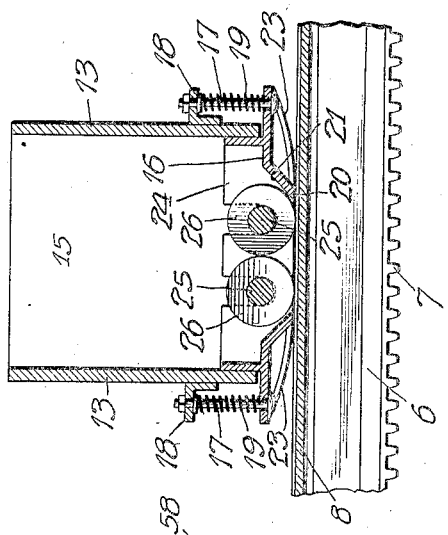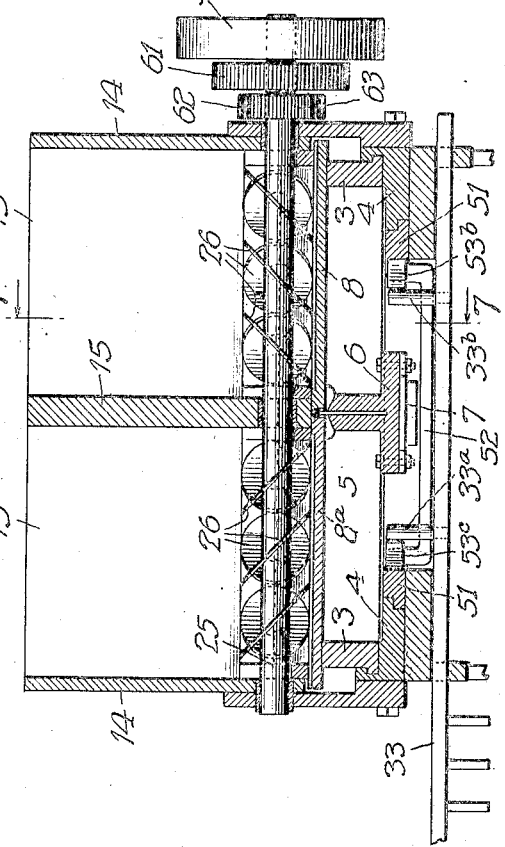

W. H. NORDHAUS 1,637,426

MACHINE FOR COATING ELECTRIC STORAGE BATTERY PLATES

Filed Aug. 29, 1921    4 Sheets-Sheet 4

Witness
Martin N. Olsen

Inventor
William H. Nordhaus
By Rector, Hibben, Davis & Macauley
His Attys

Patented Aug. 2, 1927.

1,637,426

UNITED STATES PATENT OFFICE.

WILLIAM H. NORDHAUS, OF CHICAGO, ILLINOIS, ASSIGNOR, BY MESNE ASSIGNMENTS, TO K. W. BATTERY COMPANY, OF CHICAGO, ILLINOIS, A CORPORATION OF ILLINOIS.

MACHINE FOR COATING ELECTRIC STORAGE-BATTERY PLATES.

Application filed August 29, 1921. Serial No. 496,315.

My invention relates to a machine designed to semi-automatically accomplish the coating or "pasting" of the lead or metal composition grids used as a frame for the support of the plastic active material of the plates of electric storage batteries of well-known form and construction. In coating or pasting plates by hand, which is the usual practice, a row of grids are laid down upon a smooth table, the moist plastic material, composed of red lead, litharge, and other ingredients according to the particular formula being used, is then rubbed into the grid openings and the surplus material struck off with a straight edge. A sheet of paper, the size of a grid is then applied to the pasted face of each grid, and the grids are reversed and the filling operation repeated, after which the pasted plates are lifted and stacked, the sheets of paper being stripped off. The object of my present invention is to provide a machine by which this coating or filling operation may be rapidly and effectively accomplished, with a corresponding reduction in the amount of labor required to coat a given number of plates. Inasmuch as handwork of this character frequently has a deleterious effect upon the health of the workmen engaged in it, it is particularly desirable to reduce such labor to a minimum. With the objects mentioned in view I have designed and invented the novel plate coating machine hereinafter described in detail, and which is illustrated in the accompanying drawings; the essential elements of my invention being more particularly recited in the appended claims. It will be understood, however, that my invention is capable of modification and variation, by changes in the form and arrangement of parts and the substitution of equivalent elements for those described, and I therefore desire my claims construed to include all modifications and equivalent elements within the true spirit and scope of my invention.

Figure 8:
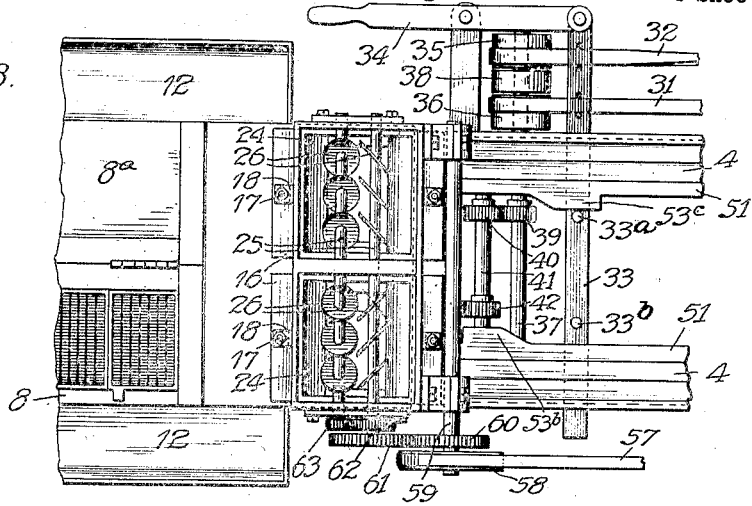
Figure 9:
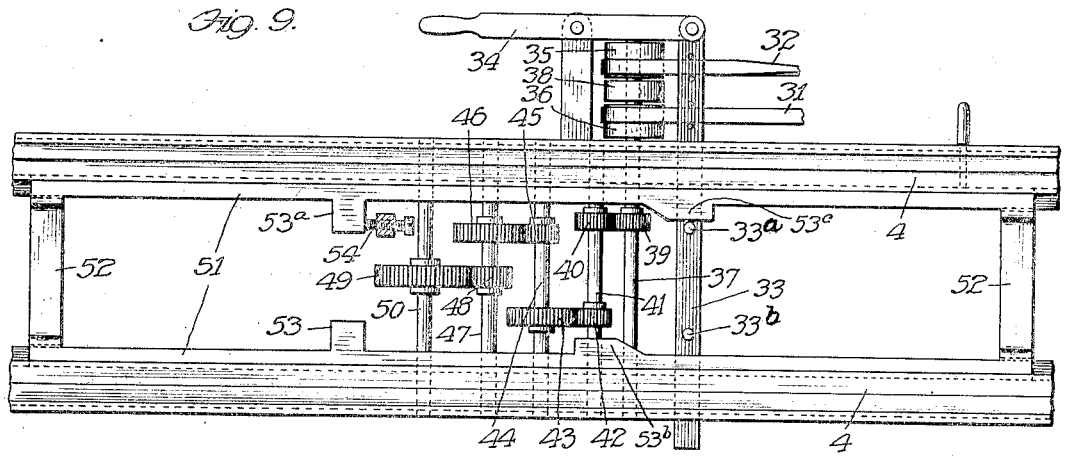
Figure 10:
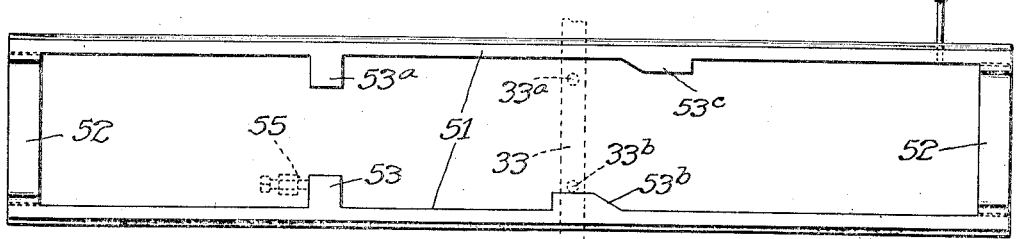

Of the accompanying drawings forming part of this specification, Fig. 1 is a top plan view of my novel machine for coating electric storage battery plates; Fig. 2 is a view of the right side of the machine; Fig. 3 is a horizontal section on the plane indicated by the line 3—3 of Fig. 2; Fig. 4 is a vertical longitudinal section of the machine on a plane indicated by the line 4—4 of Fig. 1; Fig. 5 is a vertical cross-section of the machine in the plane of the line 5—5 of Fig. 1; Fig. 6 is a vertical section of the material hopper and adjacent portions of the machine frame and reciprocating plate table therebelow, taken on a transverse plane extending centrally between the feed rollers; Fig. 7 is a vertical section on the line 7—7 of Fig. 6; Fig. 8 is a plan view of the central portion of the machine on a larger scale than that of Fig. 1; Fig. 9 is a plan view of the central portion of the machine, with the coating mechanism and plate table removed to display a sliding frame and gearing therebelow; Fig. 10 is a view of such sliding frame, detached; and Figs. 11 and 12 are details of the three-leaved hinges used as a connection and support for the leaves of the plate table.

The same reference characters indicate the same parts in all the figures of the drawings.

The stationary frame of my machine may be constructed of any suitable material, the different parts and members, whether of wood, rolled sheet metal, or cast iron, being suitably framed and fitted together in such manner as to provide a suitable support for the movable parts of the machine and answer the purposes for which they are provided. This frame, as illustrated, includes an extended rectangular bed 1, supported on legs 2, and arranged to support a hopper structure disposed above its intermediate portion. Describing first as concisely as possible the general operation of the machine, it may be here explained that the material hopper is provided with feeding and spreading mechanism arranged to coat the top faces of a double row of plates arranged upon the two hinged leaves of a horizontal plate-carrying table which is slidingly mounted in the bed of the machine and is arranged to be reciprocated from a position of rest at what will be termed the front or forward end of the machine past and underneath the hopper and coating mechanism to the rear end of the machine and back again to coat the grids with the active material.

In the regular operation of the machine, between each complete to and fro traverse of the table, a row of plates, completely coated on both sides, is removed from one table leaf; the row of grids on the other leaf, coated on one side, is transferred as a whole and reversed by manipulation of the leaves to the leaf from which the coated plates have been removed; and a row of uncoated grids is then laid down on the second-mentioned leaf; the table being then reciprocated back and forth to coat simultaneously the top faces of the row of partially coated grids and the new row of uncoated grids. The work thus proceeds progressively, a row of grids being placed on one table leaf, then coated on one face, then reversed and transferred to the other leaf, then coated on the other face and removed to be replaced by a succeeding row, each successive traverse of the table simultaneously coating the upper faces of both rows.

The sliding plate-carrying table may conveniently be constructed with longitudinal side runners 3—3, engaging slide-ways in the side members 4—4 of the bed, end bars 5—5 connecting the runners, and a longitudinal frame bar 6 equipped with a rack 7 on its lower side through which it is reciprocated. The top of the table consists of two sections in the form of hinged leaves, 8—8ª, each adapted to receive a row of grids laid side by side abutting each other. Either leaf may be swung upward, around the central hinge line between the leaves, to a horizontal position on top of the other leaf, and both leaves may be swung together through an arc of 180° from such position to a horizontal position at the opposite side of the table. In the present instance the pivotal mounting for enabling this manipulation of the table leaves to be accomplished consists of a series of three-leaf hinges (see Figs. 11 and 12,) each of which has a supporting leaf 9, and two movable leaves 10 and 11, all formed with mating rolls arranged to engage the pintle of the hinge.

In alignment with the table leaf 8 and upon a stationary table 70 at the front end of the machine is arranged a paper holder 71 adapted to receive a roll of paper 72, the width of the row of grids which the leaf 8 is adapted to receive.

At the front end of the machine, on opposite sides of the table when it is in a position of rest between the coating operations, are arranged two waste troughs or boxes 12, secured to the machine frame, in convenient position to receive waste or surplus material from the table leaves.

The material hopper (see Figs. 6 and 7), comprising a box having sides 13—13, ends 14—14, and a central partition 15 dividing the box into two compartments, is secured in stationary position to the bed of the machine, and at the bottom of each compartment is arranged a yieldingly mounted, telescoping base plate or shoe 16 which is connected to the box by means of headed bolts 17 engaging such base plate and brackets 18 secured to the sides 13 of the box, springs 19 interposed between the brackets and base plates serving to yieldingly press the latter downward to a lowermost position, in which the lower edges 20 of the feed opening at the bottom of the central trough 21 in which the feed rollers are arranged will stand in a plane not higher than the top face of the thinnest grid or plate which may be passed underneath the hopper through the reciprocations of the table. It may be here explained that in practice the grids vary slightly in thickness, and the yielding mounting of the two base plates enables them to automatically adjust themselves to the grids beneath. To facilitate the passage of the grids smoothly under the base plates the ends of each base plate, that is, the sides extending longitudinally of the machine, are formed with depending curved or sloping contact members 23 arranged to contact the margins of the row of plates underneath and cause the base plate to ride smoothly to the face of the grids as they pass thereunder. The contact members 23 are continuous with the contiguous sides of a rectangular vertical flange 24 of the plate which telescopes with the vertical walls of the compartments of the hopper.

Within the two compartments of the hopper box are arranged the feed rolls, comprising a pair of shafts 25 extending transversely of the machine through both compartments and elliptical feed blades 26 mounted on said shaft and set at such an angle that their peripheries will respectively describe cylindrical paths about the axes of the particular shafts on which they are mounted. The shafts 25 are journaled in stationary bearings at the opposite sides of the hopper, and, as shown, the blades 26 extend down into the feed opening of the trough 21 of the box, the rolls being arranged at such height that the blades will just clear the thickest grid which may pass under them. By means which will hereinafter be described one of the shafts 25, in the present instance the forward shaft, is rotated twice as fast as the other, which gives a more effective feeding action than if they were rotated at the same speed.

The connections through which the table is reciprocated include a stop-motion device operable to disconnect the table from the source of power at the limit of movement of the table in each direction, and a manually operable starting lever for shifting the power connections so as to cause the table to move in the opposite direction. The power shaft 27 of the machine, which may be driven by any suitable means, as the electric motor 28 and connecting belt 29, is provided with a pulley 30 engaged by a direct belt 31 and cross-belt 32. The two belts 31 and 32 are engaged by a shifter 33 operated by a hand lever 34 through which they may be shifted in unison from an intermediate, neutral position to one or the other of two extreme positions. In central position the belts 32 and 31 respectively engage two idler pulleys 35 and 36 loosely mounted on a shaft 37, while in one extreme position the crossed belt 32 engages a pulley 38 secured to the shaft 37 to drive such shaft in one direction, and in the other extreme position the direct belt 31 engages it in the opposite direction, the belt 31 in the first case continuing to engage the idler 36, and the belt 32 in the second case continuing to engage the idler 35. The shaft 37 is equipped with a pinion 39 arranged to drive a train of reducing gearing consisting of gear wheel 40 meshing with the pinion 39 and fixed to a shaft 41; a pinion 42 on said shaft meshing with gear wheel 43 on a shaft 44; a pinion 45 on said shaft 44 meshing with a gear wheel 46 on a shaft 47; and a pinion 48 on said shaft 47 meshing with a gear wheel 49 secured to a shaft 50 which is journaled in the frame of the machine; the gear wheel 49 meshing with the rack 7 before mentioned, on the lower side of the plate-supporting table.

The stop-motion mechanism consists of a sliding frame, shifted by the table at the limits of its movement in either direction, and operatively connected with the belt shifter so as to throw the driving belts to neutral position. This frame, consisting of longitudinal members 51 slidingly mounted in the machine frame and connected by end cross bars 52—52, is equipped with a pair of contact lugs 53—53ª, and a pair of cam blocks 53ᵇ—53ᶜ, the block 53ᶜ being arranged to cooperate with a pin 33ª on the belt shifter 33 and force said shifter from extreme left or outer position (which position it occupies while the table is traveling from the rear of the machine towards the front) to neutral central position when a contact bolt 54 mounted on the lower side of the table near its rear end comes into contact with the contact lug 53ª and forces the sliding frame and cam block 53ᶜ forwardly, as the table approaches the end of its forward movement. The table is also equipped near its forward end with a contact bolt 55, arranged to come into contact with the contact lug 53 as the table approaches the end of its rearward movement, to force the sliding frame 51 rearwardly and through the cam 53ᵇ, cooperating with a pin 33ᵇ on the belt shifter 33, force said shifter from its extreme right-hand position, occupied while the table is moving rearwardly, to neutral central position. It will be noted that after either cam has forced the belt shifter to neutral position its longitudinal inner face blocks a return of the shifter, and the hand lever 34 can therefore only be operated to cause a movement of the carriage in a direction opposite to that just terminated.

The feeding rolls are continuously rotated by means of a pulley 56 on the power shaft 27, a connecting belt 57, a pulley 58 on a shaft 59 carrying a pinion 60, a gear wheel 61 fast to one of the shafts 25 on which the feed blades are mounted, and intermeshing pinions on said shafts 25, the rear pinion 62 having twice as many teeth as the front pinion 63 in order that the front roll may be rotated twice as fast as the rear roll.

When the machine is in regular operation, the row of plates which have been coated on both sides at the end of a coating, traverse of the table will lie on the table 8ª, and the grids coated on one side only on the table 8, both rows lying upon strips of paper between them and the table. The procedure followed by the operator is as follows: He first removes the finished plates from the table leaf 8ª, stripping them from the underlying paper and then removing the paper. He then lays down a strip of paper from the roll 72 on top of the coated face of the grids on the table leaf 8, and then swings the leaf 8ª over on the right side of the table. The tables leaves 8 and 8ª are then turned together to horizontal position at the left side of the table and the leaf 8 then returned to its original position, leaving the partially coated grids on the table 8ª in position to receive a coating on their uncoated sides. A strip of paper is now laid down on the table leaf 8, and a row of grids placed thereon, and the operator then operates the hand lever 34 to shift the belt shifter from neutral central position to inner position and cause the plate table and plates to pass rearwardly beneath the coating mechanism. After the table has passed underneath the coating mechanism and has come to a stop in rearward position, the operator again operates the hand lever in the opposite direction to shift the belt-shifter from the neutral central position which it has just assumed in stopping the travel of the table to extreme outer position, to cause the table to pass forwardly under the coating mechanism to its forward position of rest. I have preferred to so design the mechanism that the table will come to a stop at the end of its rearward movement, and to provide a manual control for causing its return, rather than an automatic return mechanism for reversing the table movement, although such mechanisms are well known and may be employed if preferred. However, I regard the manual control of the return movement of the table, and the mechanism which I have devised for accomplishing such movement, as desirable features of my invention.

I claim:—

1. In a machine of the character described, a plate table arranged to receive a double row of grids, means for reciprocating said table horizontally, and coating mechanism above and adjacent the path of said table arranged to coat grids on said table, said table having a pair of movable sections operable to reverse and transfer the grids from one row to the other.

2. In a machine of the character described, a plate table having two sections arranged to each receive a row of grids, means for reciprocating said table horizontally, and coating mechanism above and adjacent said table, said table sections being hingedly connected to be reversed and to transfer the row of grids on one section from such section to the other section.

3. In a machine of the character described, a plate table having two hinged leaves arranged to each receive a row of grids, means for reciprocating said table horizontally, and coating mechanism above and adjacent the path of said table arranged to coat grids on said table, said table leaves being arranged to be swung into parallelism to each other, whereby a row of grids on one leaf may be reversed and transferred to the other table.

4. In a machine of the character described, a horizontally reciprocating plate table including a frame having side members slidingly mounted in the machine frame, coating mechanism above and adjacent said table, and a pair of table leaves each arranged to receive a row of grids, said leaves being hinged upon a common axis to said frame along its central longitudinal line, whereby a row of grids on one leaf may be reversed and transferred to the other leaf.

5. In a machine of the character described, a horizontally reciprocating plate table including a frame having longitudinal side runners slidingly mounted in the machine frame and having a longitudinal center member, coating mechanism above and adjacent said table, and a pair of table leaves each arranged to receive a row of grids, said leaves being hinged upon a common axis to said center member, whereby a row of grids on one leaf may be reversed and transferred to the other leaf.

6. In a machine of the character described, a sliding plate table including a frame having side members slidingly mounted in the machine frame and a pair of table leaves hinged to said frame along its central longitudinal line, said frame being equipped with a rack whereby it may be reciprocated and a gear wheel carried by the machine frame and arranged to cooperate with said rack.

7. In a machine of the character described, a sliding plate table including a frame having longitudinal side runners slidingly mounted in the machine frame and having a longitudinal center member and a pair of table leaves hinged to said center member, the under side of said center member being equipped with a rack whereby it may be reciprocated, and a gear wheel carried by the machine frame and arranged to cooperate with said rack.

8. In a machine of the character described, a reciprocating plate table having a sliding frame and a pair of table leaves hinged thereto upon a central longitudinal line and reversible to opposite horizontal positions, coating mechanism arranged adjacent the path of said table, and means for reciprocating said table including a stop motion device for disconnecting said reciprocating means at the conclusion of a traverse of the table in either direction.

9. In a machine of the character described and having a movable plate-carrying table arranged to support grids, coating mechanism arranged above said table and comprising a hopper having a telescoping, yielding base arranged to bear on said grids and formed with a feed opening closely adjacent the upper faces of such grids, and feed means arranged to force material through said feed opening into the openings of the grids.

10. In a machine of the character described and having a movable plate-carrying table arranged to support grids, coating mechanism arranged above said table and comprising a hopper having a spring-pressed base arranged to bear on said grids and formed with a feed opening closely adjacent the upper faces of such grids, and feed rolls arranged in said hopper adjacent said opening and arranged to force material therethrough into the openings of the grids.

11. In a machine of the character described and having a movable plate-carrying table arranged to support grids, coating mechanism arranged above said table and comprising a hopper having a base arranged to bear on said grids and formed with a feed opening closely adjacent the upper faces of such grids, and feed rolls arranged adjacent said opening and provided with obliquely set elliptical feed plates arranged to force material through said feed opening into the openings of the grids.

12. In a machine of the character described and having a movable plate-carrying table arranged to support grids, coating mechanism arranged adjacent said table and comprising a hopper having a base arranged to bear on said grids and formed with a feed opening closely adjacent the upper faces of such grids, and feed rolls arranged adjacent said opening and provided with obliquely set elliptical feed plates arranged to force material through said feed opening into the openings of the grids, said rolls being arranged to rotate at different rates of speed.

13. In a machine of the character described and having a movable plate-carrying table arranged to support grids, coating mechanism arranged above said table and comprising a hopper having a base arranged to bear on said grids and formed with a feed opening closely adjacent the upper faces of such grids, and a pair of feed rolls arranged adjacent said feed opening and provided with obliquely set elliptical feed plates arranged to rotate downwardly along the adjacent portions of their peripheries.

14. In a machine of the character described and having a movable plate-carrying table, coating mechanism arranged above said table and including a hopper having a base formed with a feed opening closely adjacent the upper faces of the plates on said table and with inclined side members adapted to ride upon the surface of the plates.

15. In a machine of the character described and having a movable plate-carrying table, coating mechanism arranged above said table and having a telescoping spring-pressed base formed with a feed opening closely adjacent the upper faces of plates on said table and with inclined side members adapted to ride upon the surface of the plates.

16. In a machine of the character described and having a movable plate-carrying table, coating mechanism arranged above said table and including a hopper having a telescoping yielding base formed with a central open-bottom depression closely adjacent the upper faces of plates on said table and inclined side members adapted to ride upon the surface of the plates, and feed rollers extending into said depression.

17. In a machine of the character described, a horizontally movable plate-carrying table arranged to receive a double row of plates, said table having a pair of movable sections operable to reverse and transfer the plates from one row to another, and coating means above the path of travel of plates upon said table arranged to simultaneously coat both rows of plates.

18. In a machine of the character described, a horizontally movable plate-carrying table arranged to receive a double row of plates, said table having a pair of movable sections operable to reverse and transfer the plates from one row to another, and a double compartment hopper having feed openings arranged above and in vertical alignment with the respective rows of plates.

19. In a machine of the character described, a horizontally reciprocable plate-carrying table, said table having two movable sections each arranged to receive a row of plates and said sections being operable to reverse and transfer the row of plates on one section from such section to the other section, and a double-compartment hopper arranged above and adjacent said table, each compartment having a feed opening adjacent and in alignment with one of the rows of plates.

20. In a machine of the character described, a horizontally reciprocable plate-carrying table, said table having two sections each arranged to receive a row of plates and said sections being operable to reverse and transfer the row of plates on one section from such section to the other section, and a double-compartment hopper arranged above and adjacent said table, each compartment of the hopper having a yielding telescoping base provided with a feed opening adjacent and in alignment with one of the rows of plates.

21. In a machine of the character described, a horizontally reciprocable plate-carrying table, having two hinged leaves arranged to each receive a row of plates and arranged to be swung into parallelism with each other, whereby said leaves may be manipulated to progressively reverse and transfer plates from one leaf to the other, and a hopper extending above said leaves and having two compartments, each compartment having a feed opening adjacent and in alignment with one of the rows of plates.

WILLIAM H. NORDHAUS.